(12) United States Patent
Chang et al.

(10) Patent No.: US 8,506,153 B2
(45) Date of Patent: Aug. 13, 2013

(54) LIGHT GUIDE PANEL AND BACK LIGHT MODULE THEREOF

(75) Inventors: Kuang-Yao Chang, Shenzhen (CN); Che-Chang Hu, Shenzhen (CN); Jing Zhang, Shenzhen (CN)

(73) Assignee: Shenzhen China Star Optoelectronics Technology Co., Ltd, Guangdong (CN)

( * ) Notice: Subject to any disclaimer, the term of this patent is extended or adjusted under 35 U.S.C. 154(b) by 214 days.

(21) Appl. No.: 13/143,438

(22) PCT Filed: May 19, 2011

(86) PCT No.: PCT/CN2011/074308
§ 371 (c)(1),
(2), (4) Date: Jul. 6, 2011

(87) PCT Pub. No.: WO2012/145945
PCT Pub. Date: Nov. 1, 2012

(65) Prior Publication Data
US 2012/0275187 A1    Nov. 1, 2012

(30) Foreign Application Priority Data

Apr. 26, 2011    (CN) .......................... 2011 1 0105561

(51) Int. Cl.
*F21V 7/04* (2006.01)
(52) U.S. Cl.
USPC .......................................... 362/626; 362/623

(58) Field of Classification Search
USPC .......................... 362/606, 615, 623, 625–626
See application file for complete search history.

(56) References Cited

U.S. PATENT DOCUMENTS

| | | | | |
|---|---|---|---|---|
| 6,011,602 | A * | 1/2000 | Miyashita et al. | 349/65 |
| 6,167,182 | A * | 12/2000 | Shinohara et al. | 385/129 |
| 6,330,386 | B1 * | 12/2001 | Wagner et al. | 385/120 |
| 7,164,842 | B2 * | 1/2007 | Chen | 385/147 |
| 7,195,389 | B2 * | 3/2007 | Parker et al. | 362/606 |
| 7,517,131 | B2 * | 4/2009 | Hsieh | 362/625 |
| 2007/0058394 | A1 * | 3/2007 | Yu | 362/615 |
| 2007/0076417 | A1 * | 4/2007 | Yang et al. | 362/458 |
| 2008/0285308 | A1 * | 11/2008 | Clary et al. | 362/619 |
| 2008/0291695 | A1 * | 11/2008 | Okayasu et al. | 362/619 |

* cited by examiner

*Primary Examiner* — Julie Shallenberger
(74) *Attorney, Agent, or Firm* — Troutman Sanders LLP

(57) ABSTRACT

The invention relates to an LGP and a back light module thereof, wherein the LGP comprises a light input surface, a bottom surface and a light output surface opposite to the bottom surface, and is characterized in that the bottom surface and/or the light output surface is provided with a plurality of microstructures, distribution rules for microstructures along the direction parallel to the light input surface of the LGP are: the microstructures in the middle of the LGP are closely arranged, and the microstructures on the two sides are sparsely arranged. In the LGP provided in the invention, the light output in the direction parallel to the light input surface can reach the brightness distribution with high middle and low edges, thereby achieving higher efficiency of light energy utilization.

14 Claims, 4 Drawing Sheets

LIGHT GUIDE PANEL AND BACK LIGHT MODULE THEREOF

BENEFIT CLAIMS

This application is a US National Stage of International Application No. PCT/CN2011/074308, filed May 19, 2011, which claims the benefit of CN201110105561.4 filed Apr. 26, 2011.

FIELD OF THE INVENTION

The invention relates to the technical field of an LCD, in particular to a light guide panel and a back light module thereof.

BACKGROUND OF THE INVENTION

At present, the LED side light type lighting is adopted on a small-sized thin LCD back light module, wherein, an LGP is an essential element. In the existing structural design of the LGP, reasonable microstructures are usually distributed on the bottom surface of the LGP, and the microstructures are utilized to obtain the light of LED incident to the LGP. The microstructures can scatter and reflect the light rays, and finally exit from the LGP, thereby reaching the even brightness of the panel surface of the whole LGP.

Please refer to FIG. 1 which is the planar structure diagram of an existing back light module. The back light module comprises an LGP 1 and an LED light bar 4. The LGP 1 comprises a light input surface 2 opposite to the LED light bar 4, a bottom surface 5, a light output surface (not labeled) opposite to the bottom surface 5, and two side surfaces (not labeled) perpendicular to the light input surface 2. In the Figure, x direction is the direction parallel to the light input surface 2 of the LGP 1; y direction is the direction parallel to the two side surfaces of the LGP 1. The bottom surface 5 of the LGP 1 is provided with a plurality of microstructures 3 parallel to x direction.

Generally speaking, the light ray is concentrated in the central area of the LGP 1, which is a relatively ideal light output situation of the LGP 1 and conforms to the human eyes' vision. Through the experiment, the light output situation of the LGP 1 in y direction is high brightness in the center and low brightness on edges; the light output of the LGP 1 in x direction is that the light is not well concentrated in the center. Thereby causing the light energy loss, and reducing the light utilization efficiency.

SUMMARY OF THE INVENTION

In order to solve the technical problem of low light utilization efficiency of an LGP in the prior art, an LGP with higher light utilization efficiency and a back light module thereof is necessary to be provided.

An LGP comprises a light input surface, a bottom surface, and a light output surface opposite to the bottom surface. The bottom surface and/or the light output surface is provided with a plurality of microstructures which comprise a plurality of first microstructures and second microstructures; the bottom surface and/or the light output surface of the LGP is divided into three parts which are the left side, the middle, and the right side along the direction parallel to the light input surface. The first microstructures are distributed in the left and the middle parts, and the second microstructures are distributed in the middle and the right parts. The distribution rule of the microstructures along the direction parallel to the light input surface is: the microstructures in the middle of the LGP are arranged closely and microstructures on the two sides are arranged sparsely.

Preferentially, pluralities of first microstructures are arranged parallelly; pluralities of second microstructures are arranged parallelly.

Preferentially, the first microstructures and the second microstructures are both parallel to the light input surface of the LGP.

Preferentially, an included angle is formed by crossing the middle of the first microstructures and the second microstructures.

Preferentially, the LGP further comprises two side surfaces perpendicular to the light input surface. In the direction parallel to the side surfaces of the LGP, if the microstructures are further from the light input surface, the distribution density of microstructures is closer.

Preferentially, the microstructures are grooves formed on the bottom surface of the LGP, the cross section thereof is at least one of semicircle, rhombus, or semiellipse.

Preferentially, groove openings are rectangle.

Preferentially, lengths of all the microstructures are the same. The invention also provides an LGP, which comprises a light input surface, a bottom surface, and a light output surface opposite to the bottom surface. The bottom surface and/or light output surface is provided with a plurality of microstructures, and the distribution rule of microstructures along the direction parallel to the light input surface is: the microstructures in the middle of the LGP are arranged closely and microstructures on the two sides are arranged sparsely.

Preferentially, the LGP further comprises two side surfaces perpendicular to the light input surface. The bottom surface along the direction parallel to the light input surface is divided into a plurality of rows. Every row comprises a plurality of microstructures in which the space between a plurality of microstructures close to two side surfaces of the LGP is larger and the space between a plurality of microstructures close to the middle of the bottom surface is smaller.

Preferentially, the microstructures are grooves formed on the bottom surface of the LGP. The openings of the grooves are rectangle with the same lengths and the long edge is parallel to the light input surface of the LGP.

Preferentially, in the direction parallel to the side surfaces of LGP, if the microstructures are further from the light input surface, the distribution density of microstructures is closer.

Preferentially, the LGP further comprises two side surfaces perpendicular to the light input surface. The bottom surface of the LGP along the direction parallel to the side surfaces is divided into a plurality of lines. Every line comprises a plurality of microstructures of which the long side is parallel to the side surfaces of the LGP. The distribution rule of the microstructures in every line in the direction of light input surface is: the space between a plurality of microstructures close to the middle of the line is smaller and the space between a plurality of microstructures close to the two side surfaces of the LGP is larger.

The invention also provides a back light module, which comprises a light source and an LGP.

The invention provides an LGP and a back light module thereof. A plurality of microstructures are arranged on the light output surface/the bottom surface of the LGP. The distribution rule of the microstructures along the direction parallel to the light input surface of the LGP is: the microstructures in the middle of the LGP are arranged closely and microstructures on the two sides are arranged sparsely. The microstructures can make the light output of the LGP in the direction parallel to the light input surface reach the brightness distribution with high brightness in the center and low brightness on edges, thereby improving the utility efficiency of light.

The LGP comprises a light input surface, a bottom surface and a light output surface opposite to the bottom surface, and the bottom surface and/or the light output surface is provided with a plurality of microstructures, distribution rules for microstructures along the direction parallel to the light input surface are: the microstructures in the middle of the LGP are closely arranged, and the microstructures on the two sides are sparsely arranged.

Preferentially, the LGP further comprises two side surfaces vertical to the light input surface, the bottom surface is divided into a plurality of rows along the direction parallel to the light input surface, each row comprises a plurality of microstructures, the space between each two microstructures close to the two side surfaces of the LGP is larger, while that between each two microstructures close to the middle of the bottom surface is smaller.

Preferentially, the microstructures are grooves formed on the bottom surface of the LGP, opening of the grooves are rectangular with the same lengths, and longer edges parallel to the light input surface of the LGP.

Preferentially, the further the distance from microstructures in the direction parallel to the side surfaces of the LGP to the light input surface is, the closer the distribution density of microstructures is.

Preferentially, the LGP further comprises two side surfaces vertical to the light input surface, the bottom surface of the LGP is divided into a plurality of lines along the direction parallel to the side surfaces, each line comprises a plurality of microstructures, longer edges of the microstructures are parallel to the side surfaces of the LGP, and distribution rules for each line of microstructures in the direction of the light input surface are: the space between each two microstructures close to the middle of the line is smaller, while that between each two microstructures close to the side surfaces of the LGP is lager.

DESCRIPTION OF ATTACHED DRAWINGS

In order to make the technical proposal of the invention clearer, the following are details by combining figures.

DETAILED DESCRIPTION OF THE EMBODIMENTS

Figure 1:
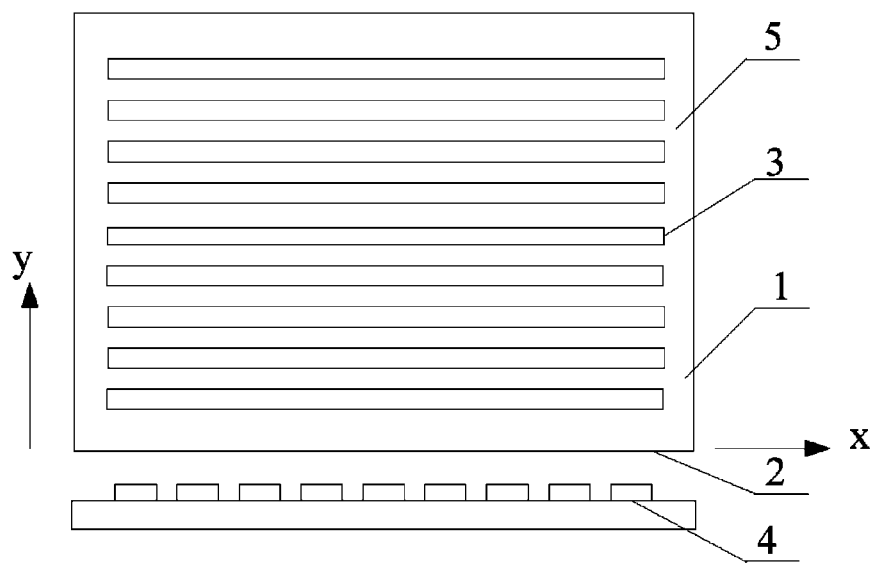
FIG. 1 is the planar structure diagram of an existing back light module.
Figure 2:
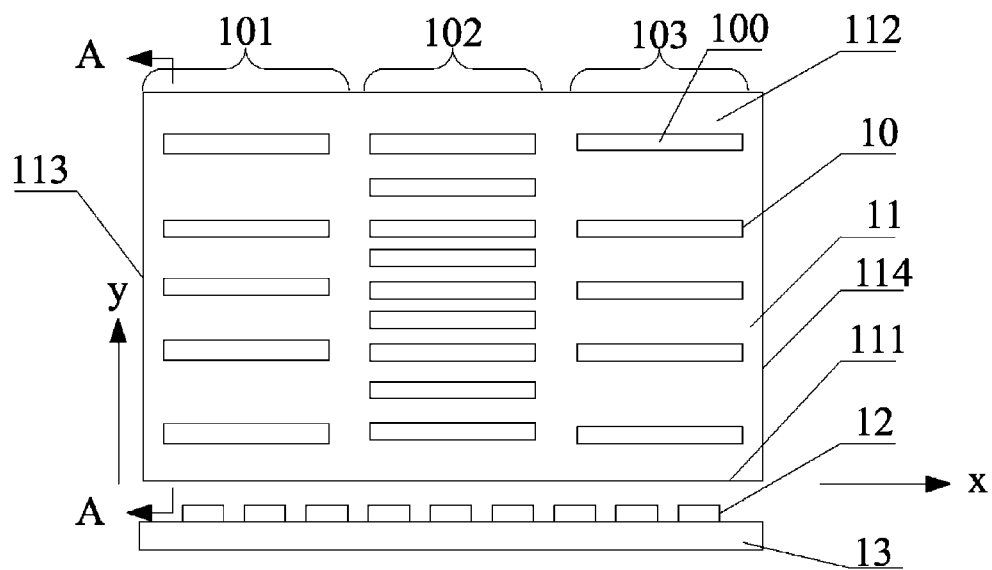
FIG. 2 is the planar structure diagram for the first embodiment of the back light module in the invention.

Please refer to FIG. 2 which is the planar structure diagram for the first embodiment of the back light module in the invention. The back light module comprises a light source (not labeled) and an LGP 11. The light source is an LED light bar which comprises a PCB 13 and a plurality of LEDs 12 arranged on the PCB 13. The LGP 11 comprises a light input surface 111 opposite to the LED light bar, a bottom surface 112, a light output surface (not shown in the figure) opposite to the bottom surface 112, and two side surfaces 113 and 114 perpendicular to the light input surface 111. The bottom surface 112 along x direction parallel to the light input surface 11 is divided into roughly equal three rows (the left, the middle, and the right rows, 101, 102, and 103). Every row comprises a plurality of microstructures 10. The microstructures 10 in y direction parallel to the side surfaces 113 and 114 are aligned. Wherein, the space between the microstructures 10 positioned in the left row 101 and the right row 103 is larger and the space between the microstructures 10 positioned in the middle row 102 is smaller.

In the embodiment, the bottom surface 112 of the LGP 11 comprises roughly equal and aligned the left, the middle, and the right rows of (101, 102, and 103) microstructures 10. In other embodiments, the distribution of the microstructures 10 on the bottom surface 112 of the LGP 11 can be also divided into more than three rows, such as four rows, and five rows, etc. Wherein, the distribution rule of the microstructures 10 is still: the space between a plurality of microstructures 10 in the row close to the side surfaces 113 and 114 of the LGP 10 is larger, and the space between a plurality of microstructures 10 in the line close to the middle of the LGP 10 is smaller. Besides, in a plurality of rows of microstructures 10, the length of microstructures 10 in various rows can be unequal.

Figure 3:
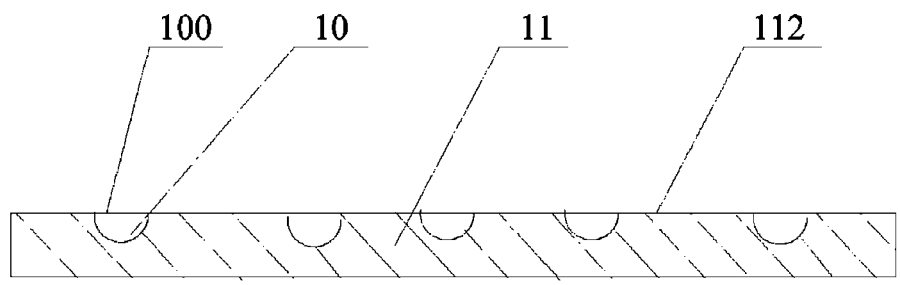
FIG. 3 is the section view enlarged drawing of the LGP of the back light module along A-A direction which is shown in FIG. 2.

As shown in FIG. 3, FIG. 3 is the section view enlarged drawing of the LGP of the back light module along A-A direction which is shown in FIG. 2. In the embodiment, the microstructures 10 are grooves formed on the bottom surface 112 of the LGP 11 and the cross section thereof (not shown) is semicircle. In other embodiments, the cross section of microstructures 10 can be also rhombus or semiellipse, etc. The openings 100 of the grooves are rectangle with the same lengths and the long side is parallel to x direction.

Compared with the prior art, the space between the microstructures 10 in the left row 101 and right row 103 of the bottom surface 112 of the LGP 11 in the embodiment is larger, and the space between the microstructures 10 in the middle row 102 is smaller. Therefore, the distribution rule of the microstructures 10 along x direction parallel to the light input surface 11 is: the microstructures 10 positioned in the middle of the LGP 11 are arranged closely and the microstructures 10 positioned on the two sides of the LGP 11 are arranged sparsely. The structure distribution can concentrate light rays in x direction into the central area of the LGP 11, and make the light output of the LGP 11 in x direction reach the brightness distribution with high brightness in the center and low brightness on edges, thereby improving the utility efficiency of light.

Figure 4:
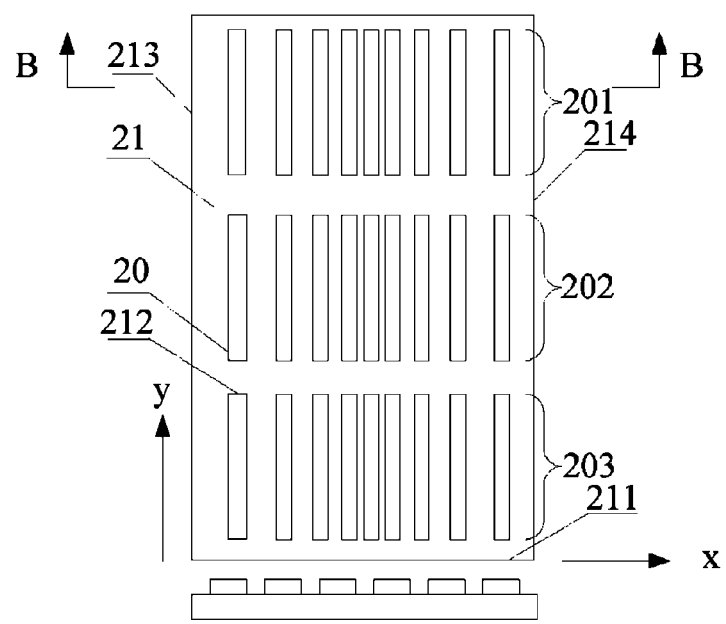
FIG. 4 is the planar structure diagram for the second embodiment of the back light module in the invention.

Please refer to FIG. 4. FIG. 4 is the planar structure diagram for the second embodiment of the back light module. In the embodiment, a bottom surface 212 of an LGP 21 is divided into the upper line 201, the middle line 202 and the lower line 203 along the y direction parallel to side surfaces 213 and 214. Each line comprises a plurality of microstructures 20, which are aligned in the x direction parallel to a light input surface 211. Wherein, rules for each line of microstructures 20 in the x direction are respectively: the space between each two microstructures 20 arranged in the middle of the line is smaller, while that between each two microstructures 20 close to the side surfaces 213 and 214 of the LGP 21 is larger. The structure makes the rules for the microstructures 20 along the x direction parallel to the light input surface 211 be: the microstructures 20 positioned in the middle of the LGP 21 are closely arranged, while the microstructures 20 positioned on the two sides of the LGP 21 are sparsely arranged.

In the embodiment, the bottom surface 212 of the LGP 21 comprises the upper line 201 of microstructures 20, the middle line 202 of microstructures 20 and the lower line 203 of microstructures 20 approximately equal along the y direction parallel to the side surfaces 213 and 214; in other embodiments, the bottom surface 212 of the LGP 21 can also include two lines of, more than three lines of a plurality of microstructures 20 approximately equal or unequal along the y direction parallel to the side surfaces 213 and 214, the rules for a plurality of microstructures 20 in each line in the x direction are respectively: the space between each two microstructures 20 close to the middle of the line is smaller, while that between each two microstructures 20 close to the side surfaces 213 and 214 of the LGP 21 is larger.

Figure 5:
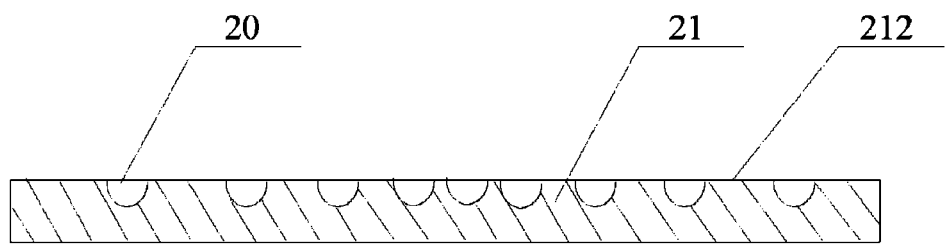
FIG. 5 is the section view enlarged drawing of the LGP of the back light module along B-B direction which is shown in FIG. 4.

As shown in FIG. 5, FIG. 5 is the sectional enlarged view of the LGP of the back light module as shown in FIG. 4 along the A-A direction. Similar to the above embodiment, the microstructures 20 in the embodiment are grooves formed on the bottom surface 212 of the LGP 21, and the cross section thereof (not shown) is semicircular. In other embodiments, the cross section of the microstructures 20 can also be diamond or semielliptical. Openings of the grooves (not labeled) are rectangular with the same lengths, and longer edges thereof are parallel to the y direction.

Figure 6:
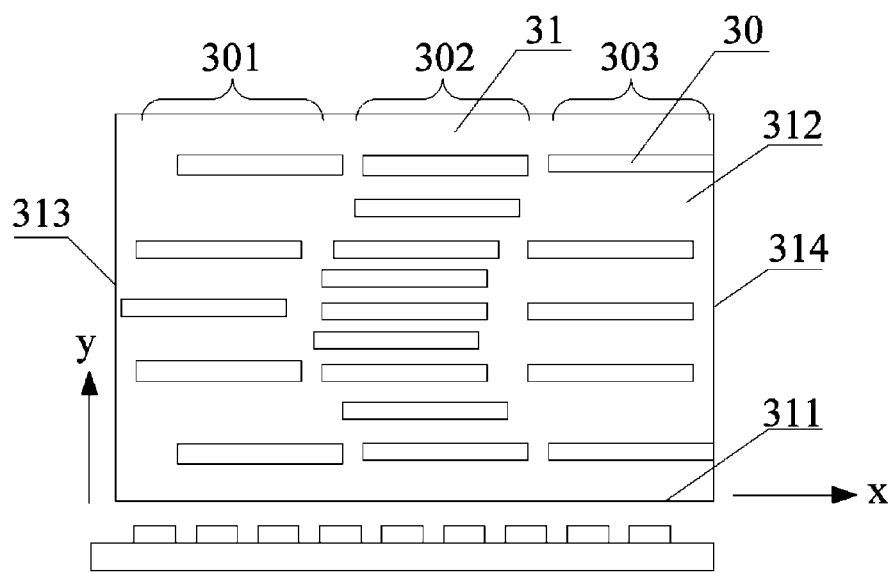
FIG. 6 is the planar structure diagram for the third embodiment of the back light module in the invention.

Please refer to FIG. 6. FIG. 6 is the planar structure diagram for the third embodiment of the back light module in the invention. Similar to the first embodiment, the embodiment is characterized in that microstructures 30 of an LGP 31 have equal length, and a bottom surface 312 is divided into the left row 301, the middle row 302 and the right row 303 which are poorly aligned along the x direction parallel to a light input surface 311. Each row comprises a plurality of microstructures 30, and the microstructures 30 in each row are arranged in the poorly aligned manner in the y direction parallel to side surfaces 313 and 314. Wherein, the space between each two microstructures 30 positioned in the left row 301 and the right row 303 is larger, while that between each two microstructures 30 positioned in the middle row 302 is smaller.

In the deformation implementation method of the embodiment, lengths of the microstructures 30 can also be different.

In the embodiment, the bottom surface 312 of the LGP 31 is divided into the left row 301, the middle row 302 and the right row 303 which are poorly aligned along the x direction parallel to the light input surface 311; in other embodiments, the bottom surface 312 of the LGP 31 can also be divided into more than three rows, such as four rows, five rows, etc. which are poorly aligned along the x direction parallel to the light input surface 311, each row comprises a plurality of microstructures 30, longer edges of the microstructures 30 are parallel to the x direction, and distribution rules for more than three rows of microstructures 30 on the bottom surface 312 of the LGP 31 are: the space between each two microstructures 30 in the row close to the side surfaces 313 and 314 of the LGP 31 is larger, while that between each two microstructures 30 in the row close to the middle of the LGP 31 is smaller.

Figure 7:
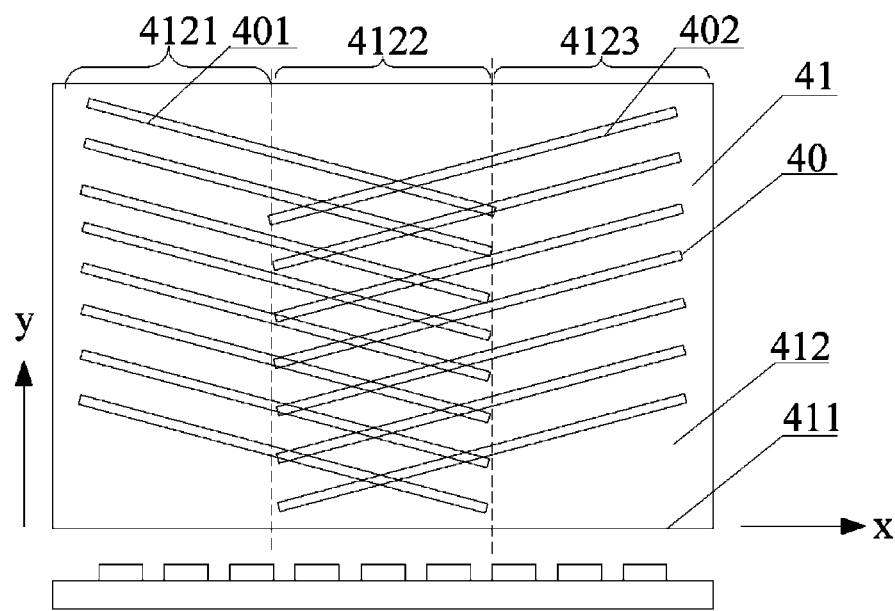
FIG. 7 is the planar structure diagram for the fourth embodiment of the back light module in the invention.

Please refer to FIG. 7. FIG. 7 is the planar structure diagram for the fourth embodiment of the back light module in the invention. In the embodiment, microstructures 40 on a bottom surface 412 of an LGP 41 include a plurality of mutually parallel first microstructures 401 and a plurality of mutually parallel first microstructures 402, that is, the plurality of first microstructures 401 are arranged in the mutually parallel manner; the plurality of second microstructures 402 are arranged in the mutually parallel manner. The bottom surface 412 of the LGP 41 is divided into the left side 4121, the middle 4122 and the right side 4123 which are approximately equal along the x direction, the first microstructures 401 are distributed on the left side 4121 and in the middle 4122, and the second microstructures 402 are distributed in the middle 4122 and on the right side 4123. The first microstructures 401 and the second microstructures 402 cross in the middle 4122 of the bottom surface 412 of the LGP 41 to form an included angle; therefore, the arrangement of microstructures 40 in the middle of the LGP 41 is closer than that on the two sides.

Figure 8:
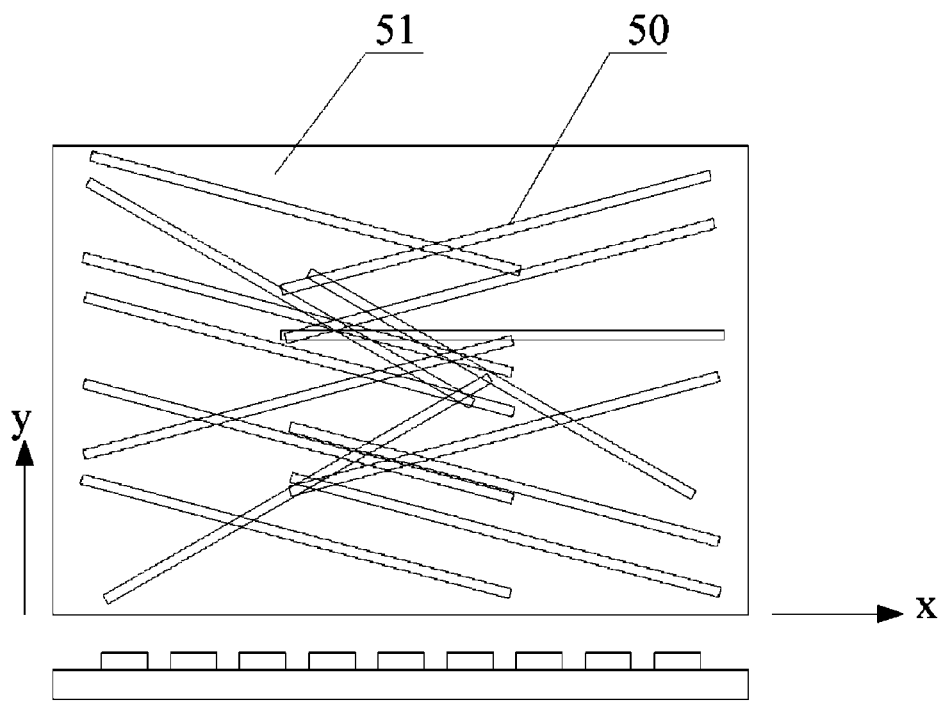
FIG. 8 is the planar structure diagram for the fifth embodiment of the back light module in the invention.

Please refer to FIG. 8. FIG. 8 is the planar structure diagram for the fifth embodiment of the back light module in the invention. In the embodiment, microstructures 50 of an LGP 51 are disorderly arranged in the staggered manner, while distribution rules for microstructures 50 along the x direction are: the microstructures 50 in the middle of the LGP 51 are closely arranged, and the microstructures 50 on the two sides of the LGP 51 are sparsely arranged.

Figure 9:
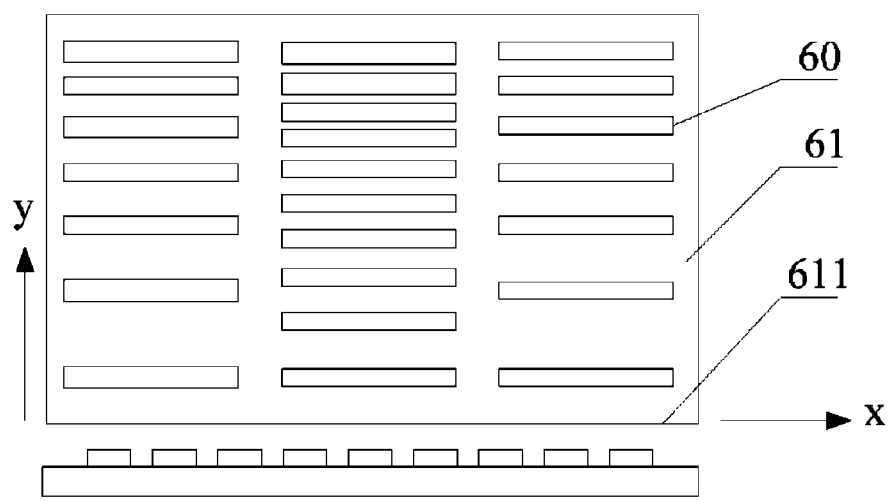
FIG. 9 is the planar structure diagram for the sixth embodiment of the back light module in the invention.

Please refer to FIG. 9. FIG. 9 is the planar structure diagram for the sixth embodiment of the back light module in the invention. Similar to the first embodiment, the embodiment is characterized in that the further the distance from microstructures 60 in the y direction parallel to a side surface (not labeled) of an LGP 61 to a light input surface 611 is, the closer the distribution density of microstructures 60 is. Because the further the distance from the microstructures 60 to the light input surface 611 is, the less spreading light rays are, and what is needed is to increase the density of the microstructures 60, so as to reach the requirement for even distribution of light output.

In the second, third, fourth and fifth embodiments, the distribution density of microstructures of the LGP in the y direction parallel to the side surface of the LGP can be set as: the further the distance from the microstructures 60 to the light input surface 611 is, the closer the distribution is, so as to achieve better efficiency for solar energy utilization.

In the fourth embodiment, the first microstructures 401 and the second microstructures 402 of the LGP 41 can be both parallel to the x direction, but not crossed.

In other embodiments, microstructures can also just arranged on the light output surface of the LGP, or simultaneously arranged on the light output surface and the bottom surface of the LGP, thereby achieving better light output effect, and improving the use ratio of light.

The embodiments mentioned as above are only the preferential embodiments of the invention, and can not limit the patent claim. The equivalent structure or flow change formed by using the description of the invention and contents of drawings, or direct or indirect application to other relevant technical fields, are all included in the extent of patent protection of the invention.

What is claimed is:

1. An LGP comprising a light input surface, a bottom surface and a light output surface opposite to the bottom surface, the LGP is characterized in that the bottom surface and/or the light output surface is provided with a plurality of microstructures, which comprise a plurality of first microstructures and a plurality of second microstructures; the bottom surface and/or the light output surface is divided into the left side, the middle and the right side along the direction parallel to the light input surface, distribution rules for microstructures along the direction parallel to the light input surface are: the microstructures in the middle of the LGP are closely arranged, and the microstructures on the two sides are sparsely arranged, and each of the first microstructures is distributed on the left side and in the middle, each of the second microstructures is distributed in the middle and on the right side; the plurality of first microstructures are arranged in the mutually parallel manner, and the plurality of second microstructures are arranged in the mutually parallel manner.

2. The LGP as claim 1, wherein the first microstructures and the second microstructures are both parallel to the light input surface of the LGP.

3. The LGP as claim 1, wherein the first microstructures and the second microstructures cross in the middle to form an included angle.

4. The LGP as claim 2, wherein the LGP further comprises two side surfaces vertical to the light input surface, and the further the distance from microstructures in the direction parallel to the side surfaces of the LGP to the light input surface is, the closer the distribution density of microstructures is.

5. The LGP as claim 4, wherein the microstructures are grooves formed on the bottom surface of the LGP, the cross section thereof is at least one shape of semicircle, diamond or semiellipse.

6. The LGP as claim 5, wherein openings of the grooves are rectangular.

7. The LGP as claim 6, wherein lengths of microstructures are equal.

8. A back light module comprising a light source and an LGP, wherein the LGP comprising a light input surface, a bottom surface and a light output surface opposite to the bottom surface, the LGP is characterized in that the bottom surface and/or the light output surface is provided with a plurality of microstructures, which comprise a plurality of first microstructures and a plurality of second microstructures; the bottom surface and/or the light output surface is divided into the left side, the middle and the right side along the direction parallel to the light input surface, distribution rules for microstructures along the direction parallel to the light input surface are: the microstructures in the middle of the LGP are closely arranged, and the microstructures on the two sides are sparsely arranged, and each of the first microstructures is distributed on the left side and in the middle, each of the second microstructures is distributed in the middle and on the right side; the plurality of first microstructures are arranged in the mutually parallel manner, and the plurality of second microstructures are arranged in the mutually parallel manner.

9. The back light module as claim 8, wherein the first microstructures and the second microstructures are both parallel to the light input surface of the LGP.

10. The back light module as claim 8, wherein the first microstructures and the second microstructures cross in the middle to form an included angle.

11. The back light module as claim 9, wherein the LGP further comprises two side surfaces vertical to the light input surface, and the further the distance from microstructures in the direction parallel to the side surfaces of the LGP to the light input surface is, the closer the distribution density of microstructures is.

12. The back light module as claim 11, wherein the microstructures are grooves formed on the bottom surface of the LGP, the cross section thereof is at least one shape of semicircle, diamond or semiellipse.

13. The back light module as claim 12, wherein openings of the grooves are rectangular.

14. The back light module as claim 13, wherein lengths of microstructures are equal.

\* \* \* \* \*